(12) United States Patent
Kurata

(10) Patent No.: US 11,934,710 B2
(45) Date of Patent: Mar. 19, 2024

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yasuo Kurata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/077,067

(22) Filed: Dec. 7, 2022

(65) Prior Publication Data

US 2023/0185493 A1 Jun. 15, 2023

(30) Foreign Application Priority Data

Dec. 14, 2021 (JP) ................. 2021-202181

(51) Int. Cl.
*G06F 3/12* (2006.01)
(52) U.S. Cl.
CPC .......... *G06F 3/1208* (2013.01); *G06F 3/1256* (2013.01); *G06F 3/1204* (2013.01)

(58) Field of Classification Search
CPC .............................. G06F 3/1208; G06F 3/1256
USPC ......................................................... 358/1.13
See application file for complete search history.

(56) References Cited

U.S. PATENT DOCUMENTS

2019/0384549 A1* 12/2019 Miyasaka ............. G06F 3/1208
2021/0337085 A1* 10/2021 Tanaka ................. H04N 1/6011

FOREIGN PATENT DOCUMENTS

JP 2016-103695 6/2016

\* cited by examiner

*Primary Examiner* — Darryl V Dottin
(74) *Attorney, Agent, or Firm* — VENABLE LLP

(57) ABSTRACT

Provided is an information processing apparatus, control method, and storage medium capable of preventing an unintended print result from being produced. The present executes making a predetermined notification in a case where a spot color printing region set to be printed in a spot color which is a color different from a process color is included in a predetermined region in a region to be printed based on print data, the predetermined region being a region other than a text region in the region to be printed based on the print data.

15 Claims, 12 Drawing Sheets

| SPOT COLOR | DESIGNATED RGB | CORRESPONDING COMMAND (BIT FLAG) |
|---|---|---|
| FLUORESCENT (255, 0, 255) | 255, 0, 255 | 0b00000001 |
| FLUORESCENT (255, 85, 255) | 255, 85, 255 | 0b00000010 |
| FLUORESCENT (255, 170, 255) | 255, 170, 255 | 0b00000100 |
| FLUORESCENT (255, 0, 170) | 255, 0, 170 | 0b00001000 |
| FLUORESCENT (255, 85, 170) | 255, 85, 170 | 0b00010000 |
| FLUORESCENT (255, 170, 170) | 255, 170, 170 | 0b00100000 |

FIG.5

```
<spotcolor>00000001</spotcolor>
```

FIG.7A

```
<spotcolor>00001000</spotcolor>
```

FIG.7B

```
<spotcolor>00001001</spotcolor>
```

FIG.7C

INFORMATION PROCESSING APPARATUS, CONTROL METHOD, AND STORAGE MEDIUM

BACKGROUND OF THE INVENTION

Field of the Invention

The present invention relates to an information processing apparatus, control method, and storage medium for performing desired spot color printing with an image output apparatus.

Description of the Related Art

Japanese Patent Laid-Open No. 2016-103695 discloses a technique for printing in which information (RGB value) of a specific color is replaced with and printed as a particular color designated in advance.

In a case of performing spot color printing, it is desired to prevent an unintended print result from being produced.

SUMMARY OF THE INVENTION

A control method of the present invention is a method of controlling an information processing apparatus, the control method comprising, obtaining print data, and making a predetermined notification based on a fact that a special color printing region, set to be printed in a special color, is included in a predetermined region in a region to be printed based on the print data, the predetermined region being a region other than a text region in the region to be printed based on the print data.

According to the present invention, it is possible to provide an information processing apparatus, control method, and storage medium capable of preventing an unintended print result from being produced.

Further features of the present invention will become apparent from the following description of exemplary embodiments with reference to the attached drawings.

BRIEF DESCRIPTION OF THE DRAWINGS

FIG. 5 is a table illustrating designated RGB values corresponding to spot colors and corresponding commands;

FIG. 7A is a diagram illustrating an example of a command to be appended;

FIG. 7B is a diagram illustrating an example of the command to be appended;

FIG. 7C is a diagram illustrating an example of the command to be appended;

DESCRIPTION OF THE EMBODIMENTS

An embodiment of the present invention will be described below with reference to the drawings.

Figure 1:
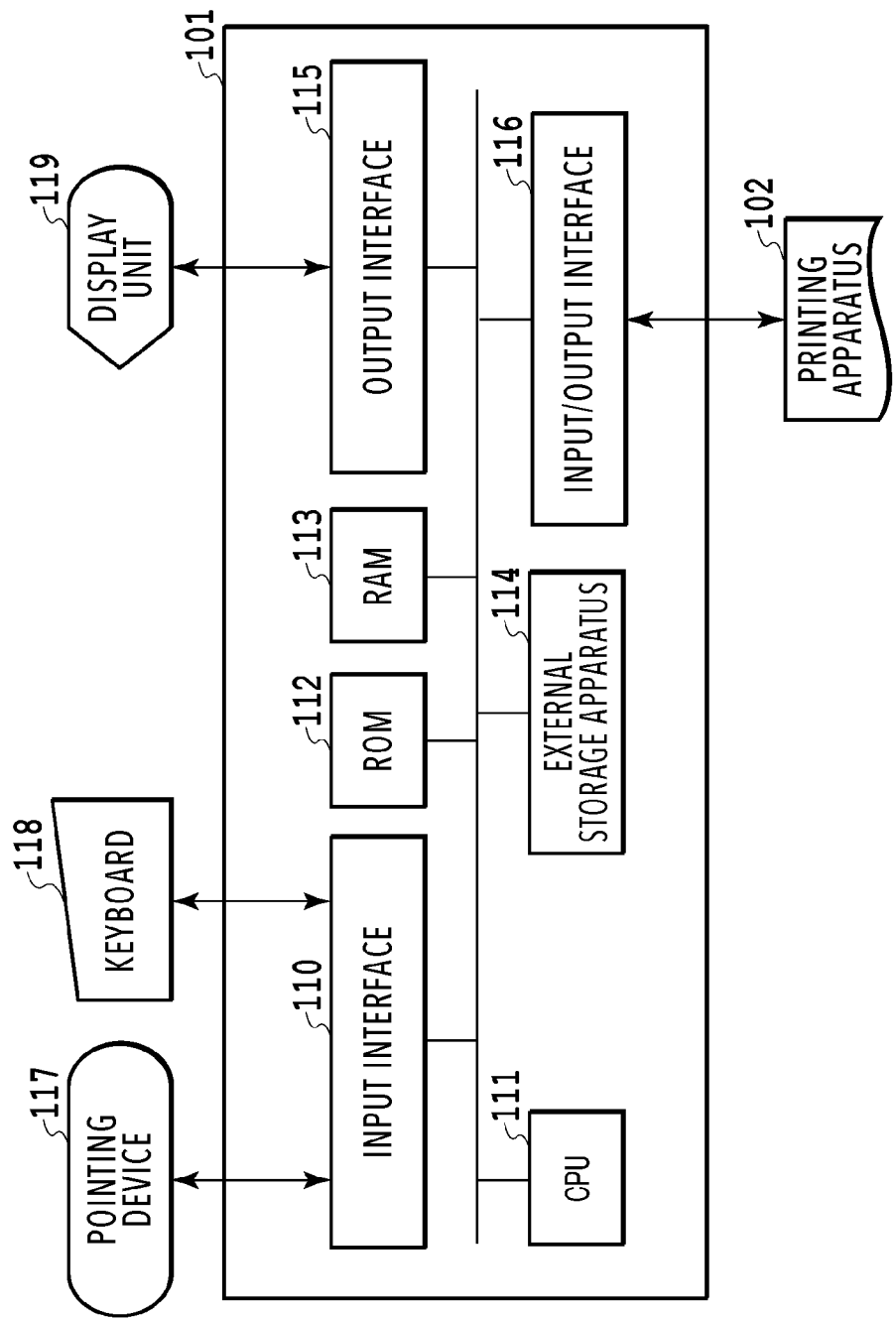
FIG. 1 is a block diagram illustrating a hardware configuration of a printing system.

FIG. 1 is a block diagram illustrating a hardware configuration of a printing system according to the present embodiment. A host computer 101 is an example of an information processing apparatus and includes an input interface 110, a CPU 111, a ROM 112, a RAM 113, an external storage apparatus 114, an output interface 115, and an input/output interface 116. Also, input devices such as a keyboard 118 and a pointing device 117 are connected to the input interface 110, and a display device such as a display unit 119 is connected to the output interface 115.

The ROM 112 stores an initialization program, and the external storage apparatus 114 stores a group of application programs, an operating system (OS), a printer driver, and other various pieces of data. The RAM 113 is used as a work memory in a case of executing the various programs stored in the external storage apparatus 114, and the like.

Note that, in the present embodiment, the CPU 111 performs processes by following the procedure of the program stored in the ROM 112 to thereby implement the later-described functions of the host computer 101 and execute the processes in the later-described flowcharts. A printing apparatus (image output apparatus) 102 is connected to the host computer 101 via the input/output interface 116. Here, the host computer 101 and the image output apparatus 102 are configured to be separate. However, these may be configured as a single information processing apparatus. Note that the image output apparatus will be described by taking an inkjet printer that performs printing by ejecting inks onto a paper surface as an example. However, printing may be executed by another method (e.g., electrophotographic method).

In the present embodiment, the image output apparatus will be described by taking an inkjet printer equipped with spot color inks as an example. Moreover, the image output apparatus in the present embodiment will be described by taking, as an example, a wideformat inkjet printer capable of performing printing on a print medium of a large size, such as A0 or B0. Also, the host computer 101 may be a desktop personal computer, a smartphone, or a laptop personal computer.

Figure 2:
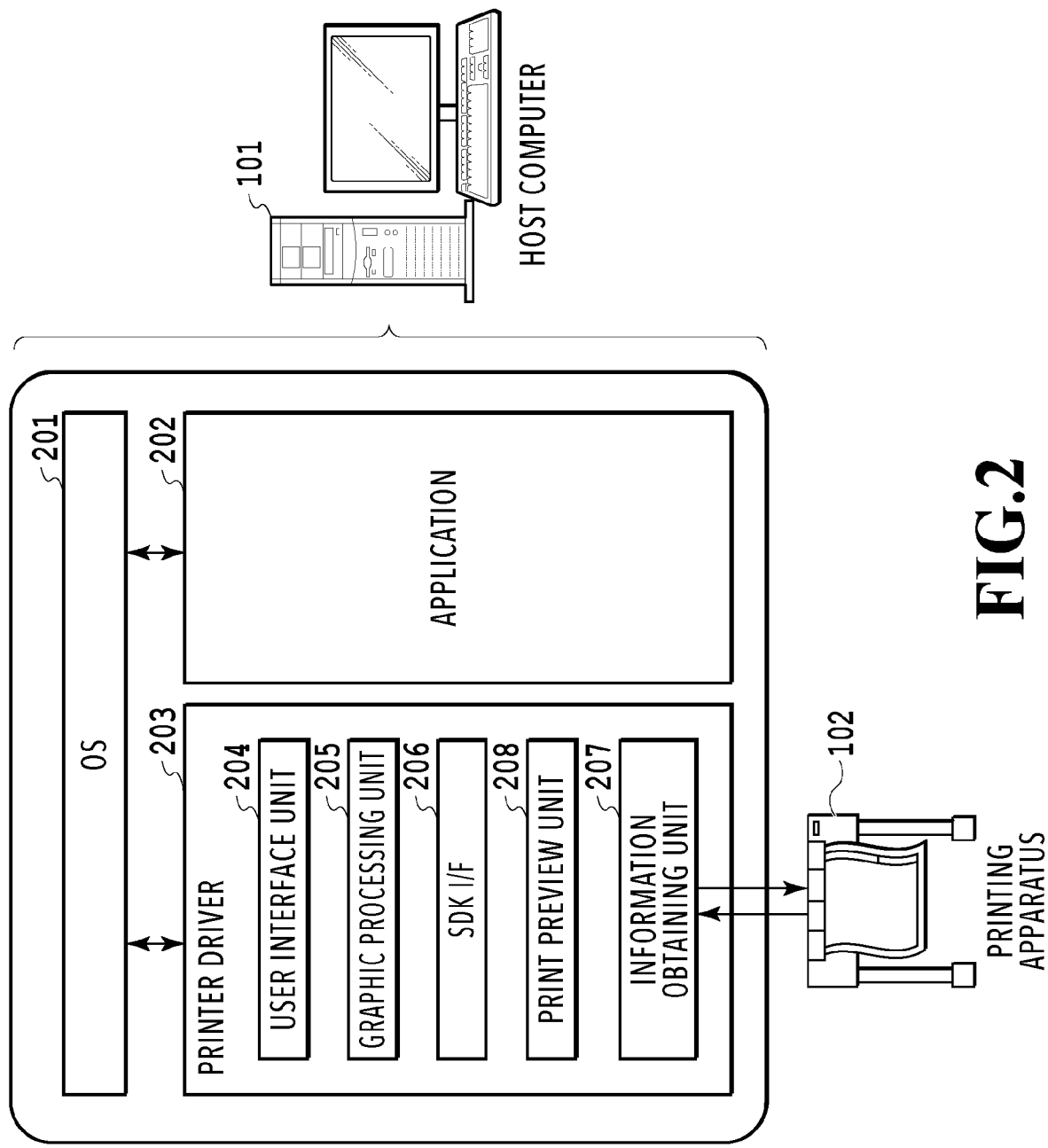
FIG. 2 is a block diagram illustrating a configuration of the printing system performing spot color printing.

FIG. 2 is a block diagram illustrating a configuration of the printing system for performing spot color printing. In the present embodiment, the printing apparatus 102 is configured to be capable of performing spot color printing which is printing using inks of spot colors that are not normal inks (i.e., inks of particular colors, which will hereinafter be referred to also as "spot color inks"). "Normal ink" is an ink for performing printing in a process color and is an ink of a color such as cyan (C), magenta (M), yellow (Y), or black (K), which is a basic process color. Note that a process color is a color expressed by one of C, M, Y, and K or a combination of two or more of C, M, Y, and K.

Also, in the present embodiment, a fluorescent pink ink and a fluorescent orange ink are used as the spot color inks. A spot color is a color different from any of process colors and is a color that cannot be expressed with only one of C, M, Y, and K or a combination of two or more of C, M, Y, and K. However, the configuration is not limited to this one. The number and colors of spot color inks may be any number and colors, and a non-fluorescent color ink(s) may be used. For example, a violet ink, a green ink, an orange ink, a gold ink, and/or a silver ink may be used as a spot color ink(s). Also, an ink of another metallic color(s) may be used. Further, an ink obtained by blending a spot color ink and another ink (e.g., a normal ink) may be used as a spot color ink.

In printing using a spot color, each pixel with the RGB value corresponding to the spot color is printed in the spot color. Note that there is a possibility that the RGB value corresponding to the spot color may be used as the RGB value corresponding to a color expressed only with a normal ink(s) (i.e., normal color). In other words, there is a case where the same RGB value as that corresponding to the spot color is set for a pixel of a color expressed only with a normal ink(s). In that case, whether to use the special ink in the printing of the pixel with the above RGB value is controlled based on whether instruction information for spot color printing is attached to the print data.

An application 202 is a piece of software for creating a content to be printed and is, for example, an image editing application for creating poster data. On the application 202, the user designates a specific RGB value(s) for an object (such as an image, a figure, or text) on which the user wishes to perform spot color printing. In a case of receiving a print request from the user, the application 202 issues a print instruction to the OS 201. In response to receiving the print instruction, the OS 201 then lets its OS printing system (not illustrated) handle the processing for the printing. Here, the following description will be given on the assumption that the OS printing system operates in cooperation with a printer driver 203 provided by the printing apparatus' vendor.

In response to receiving a request to display a print setting screen from the application 202, the OS printing system requests the printer driver 203 to display the print setting screen, and the printer driver 203 in turn displays the print setting screen by using a user interface unit 204. As will be described later, the paper size, the paper type, and the like and whether to perform spot color printing can be designated on the print setting screen.

The printer driver 203 provides a software development kit (SDK) I/F 206. Using the SDK I/F 206, the application 202 can configure print settings on the application 202 without having the printer driver 203 open the print setting screen. Further, the printer driver 203 is capable of obtaining information on the printing apparatus 102 with an information obtaining unit 207. The printer driver 203 is capable of displaying settings adjusted to the functionality of the printing apparatus 102 with the user interface unit 204 and supporting the settings with the SDK I/F 206 based on the information obtained from the printing apparatus 102. The printer driver 203 is also capable of displaying a region for receiving an input on whether to set spot color printing, and switches on or off the spot color printing based on an operation on the region. Specifically, the printer driver 203 is capable of displaying, for example, a fluorescent pink spot color printing setting. The fluorescent pink spot color printing setting is a region for receiving a selection on whether to enable spot color printing for printing pixels with the RGB value corresponding to fluorescent pink in fluorescent pink (fluorescent pink spot color printing). In a case where the fluorescent pink spot color printing is not enabled, pixels with the RGB value corresponding to fluorescent pink will be printed in a color that is not fluorescent pink. Thus, the above region can be seen as a region for receiving a setting on whether to print pixels with a specific RGB value in fluorescent pink or in a color different from fluorescent pink. The region can also be seen as, for example, a region for receiving a setting on whether to perform printing by using the spot color ink or to perform printing not by using the spot color ink but by using a normal ink(s).

In a case where a checkbox is checked, indicating that fluorescence pink spot color printing is set (enabled), instruction information for instructing the printing apparatus 102 to perform printing using fluorescence pink is attached to print data generated by the printer driver 203. Then, in a case where there is a pixel(s) with the RGB value corresponding to fluorescent pink among the pixels contained in the print data to which the instruction information has been attached, the printing apparatus 102 executes printing using the fluorescent pink spot color ink based on the print data.

In a case where the checkbox is not checked, indicating that fluorescence pink spot color printing is not set, the instruction information for instructing the printing apparatus 102 to perform printing using fluorescence pink is not attached to the print data generated by the printer driver 203. Then, even in a case where there is a pixel(s) with the RGB value corresponding to fluorescent pink among the pixels contained in the print data to which the instruction information is not attached, the fluorescent pink spot color ink is not used in the printing of this pixel(s) but a normal ink(s) is(are) used. Incidentally, another spot color printing setting may be displayed similarly to the fluorescent pink spot color printing setting.

In response to the print instruction from the application 202, the print data and the print settings of the application 202 are passed to a graphic processing unit 205 of the printer driver 203 via the OS printing system. The graphic processing unit 205 converts these pieces of data into a data format which the printing apparatus 102 can interpret, and sends them to the printing apparatus 102. Then, an ink(s) is(are) ejected from the print head of the printing apparatus 102 onto a print medium fed to the printing apparatus 102 to thereby form an image thereon. Here, in a case where spot color printing is set, the corresponding spot color ink is ejected to the pixel(s) with the designated RGB value in the print data designated to be printed in the spot color.

Also, the graphic processing unit 205 is capable of cooperating with a print preview unit 208 to make a print preview with the print data and the print settings received via the OS printing system. The print preview is a general representation of a print result from the printing apparatus 102 to be displayed on the display unit 119. Thus, the user can check the print result before the printing with the printing apparatus 102 and, if it is not as intended, can cancel the printing. Also, the user can change a print setting on a print setting screen provided by the print preview unit 208, and apply the change to the print data. While the print setting screen to be provided by the print preview unit 208 will be described later, the change is made to the print setting of spot color printing or the like designated in advance by using the print setting screen of the user interface unit 204.

Here, a description will be given of an example where the printing apparatus 102 is capable of using spot color inks to perform printing with any of predetermined six colors (special colors) using the spot colors in a case where the printer driver 203 sets spot color printing. In the case where the printer driver 203 sets spot color printing, a pixel in print data with a specific RGB value corresponding to the set spot color will be printed using the spot color ink. In the present embodiment, each of the predetermined six colors is allocated a specific RGB value. In the present embodiment, a specific RGB value is, for example, R=255 (0xFF), G=0 (0x00), and B=255 (0xFF). A pixel with this RGB value will be printed in fluorescent pink, which is one of the special colors, by using the fluorescent pink ink.

Another specific RGB value is, for example, R=255 (0xFF), G=85 (0x55), and B=0 (0x00). A pixel with this RGB value is printed in orange, which is one of the special colors, by using the fluorescent pink, M, and Y inks blended together. Note that if the configuration is, for example, such that an orange ink can be used as a spot color ink, the pixel with the above RGB value may be printed in orange by using only the orange ink. In other words, it suffices that a pixel with the specific RGB value corresponding to a spot color be printed by using at least a spot color ink, and it is not essential to perform printing with a spot color ink and a normal ink(s) blended together. Note that, in spot color printing too, only the normal inks are used to print pixels other than those with the specific RGB values corresponding to the spot colors. Also, spot color printing is executed in a case where the spot color printing is enabled by a user operation. That is, in a case where no spot color printing setting is enabled, pixels with the specific RGB values corresponding to the spot colors are printed with only the normal inks by referring to their RGB values in the usual manner.

Specifically, in a case where the printer driver 203 enables the fluorescent pink spot color printing setting and print data to be sent contains a pixel with an RGB value of R=255, G=0, and B=255, the printing apparatus 102 can perform spot color printing using the fluorescent pink ink. The same applies to the other spot colors. That is, in a case where the printer driver 203 enables the print setting of each spot color and the print data to be sent contains pixels with the RGB values corresponding to these spot colors, the printing apparatus 102 can perform the corresponding types of spot color printing. On the other hand, in a case where the printer driver 103 enables a spot color printing setting but the print data does not contain a pixel with the specific RGB value corresponding to the spot color printing, the spot color printing cannot be performed.

Figure 3A:
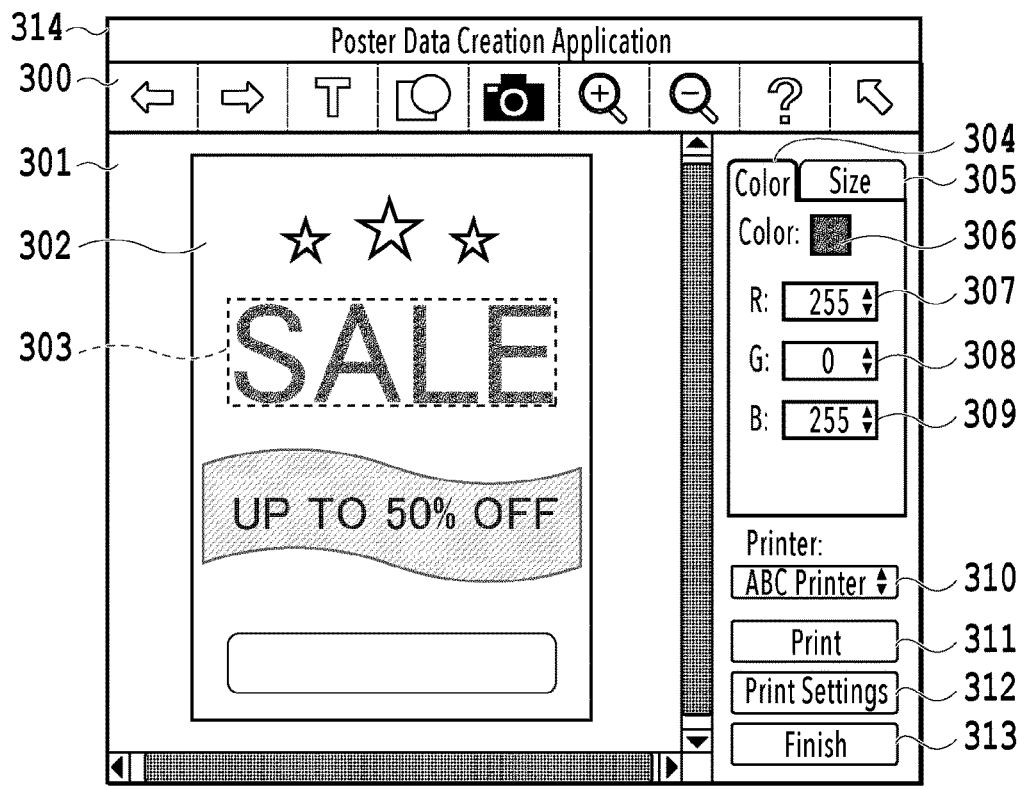
FIG. 3A is a view illustrating an example screen of a poster data creation application.
Figure 3B:
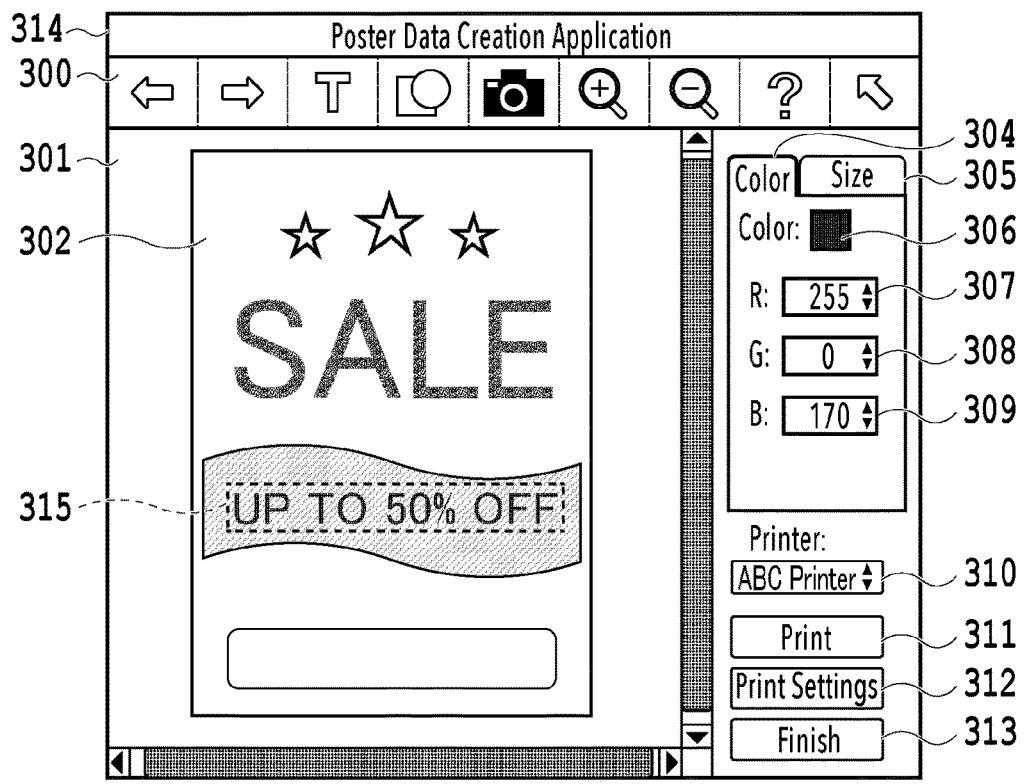
FIG. 3B is a view illustrating the example screen of the poster data creation application.

FIGS. 3A and 3B are views an example screen of a poster data creation application 314. In the present embodiment, the poster data creation application 314 is capable of editing an image to be generated by superimposing a plurality of objects. The poster data creation application 314 is also capable of executing an editing process of adding (newly superimposing) or deleting an object and/or changing the color, size, and/or position of an object based on an editing operation received from the user. In a case where such an editing operation is performed, the objects after the editing are superimposed to generate a single new image.

In a case of performing spot color printing, the user firstly selects the spot color(s) to be used in the print setting of the printer driver 203. Thereafter, on the application 202, the user creates a content and designates the RGB value corresponding to a spot color ink for a character(s) or a specific region in graphic print data desired to be printed with this spot color ink.

FIG. 3A is a view illustrating an example of the application 202 in the present embodiment, and is a view illustrating an example screen of the poster data creation application 314. The poster data creation application 314 includes toolbar buttons 300, a print data display region 301, a print data editing region 302, an object selection frame 303, an object color editing tab menu 304, and an object size change tab menu 305. The poster data creation application 314 further includes a display color 306 of an object and an R value change control 307, G value change control 308, and B value change control 309 for changing the RGB value of the object. The poster data creation application 314 also includes a control 310, a print button 311, a print setting button 312, and a finish button 313.

The poster data creation application 314 displays print data in an editable manner. With the toolbar buttons 300, the user can select functions such as undoing an editing operation and redoing the undo, creating a text object, creating a graphic object, creating a print data object, changing the display magnification, displaying the application's help information, and selecting an object. The print data display region 301 is a region where print data created by the user is displayed. The print data editing region (image editing screen) 302 is a region where the user selects any object, moves the selected object, and edits the print data by using the pointing device 117. The object selection frame 303 is a frame displayed with a dashed line which indicates to the user that, in a case where the user selects a given object, this object is being selected.

In FIG. 3A, the object selection frame 303 indicates that the text object (text image) "SALE" is being selected. The object color editing tab menu 304 displays controls for changing the color of the currently selected object in response to being selected. The object size change tab menu 305 displays controls for changing the size of the currently selected object in response to being selected.

In FIG. 3A, the object color editing tab menu 304 is selected, and the display color 306 of the object and the R value change control 307, G value change control 308, and B value change control 309 for changing the RGB value of the object are displayed. The controls for the R, G, and B values can each be set at a value of 0 to 255 by directly entering the value with the keyboard 118 or by selecting a button on the right side of the control with the pointing device 117. Also, as the RGB value is changed, the display color 306 changes according to the RGB. In the example of FIG. 3A, R=255, G=0, and B=255, which represent a first specific color value, are set as the RGB value designating the color of the text object "SALE" surrounded by the object selection frame 303. Note that, in the present embodiment, a specific color value is an RGB value corresponding to a spot color.

FIG. 3B is an example display of the poster data creation application 314 indicating that the text object "UP TO 50% OFF" is being selected. An object selection frame 315 indicates with a dashed line that the object is being selected. Also, in the example of FIG. 3B, R=255, G=0, and B=170, which represent a second specific color value, are set as the RGB value designating the color of the text object "UP TO 50% OFF" surrounded by the object selection frame 315.

Note that, in the present embodiment, the color space for data generation by the application 202 and the color space of print data to be generated by an rendering engine of the printer driver 203 are the sRGB color space, which is a standard RGB color space. Also, assume, for a simple description, that a color matching process has no impact. Assume also that the color space for data generation by the application 202 and the color space of print data to be generated by a rendering engine of the OS printing system are also the sRGB color space, which is a standard RGB color space, and that a color matching process has no impact.

That is, assume that RGB values expressed by the application 202 match the RGB values of the pixels contained in print data generated by the rendering engine of the printer driver 203 or of the OS printing system. In this way, in a case where a setting for printing an RGB value of R=255, G=0, and B=255 as a spot color is used as a print setting of the printer driver 203, print data with that RGB value is data to be printed in the fluorescence pink spot color. Also, the following description will be given on the assumption that the RGB values of the other image objects displayed in the print data editing region 302 are values other than the above RGB value.

With the control 310 included in the poster data creation application 314, the user can select a print queue of the printing apparatus 102 registered in the OS printing system in advance from a list. The print button 311 is a button which the user selects in a case of printing the print data displayed in the print data editing region 302 in the print queue selected with the control 310. The print setting button 312 is a button for opening a detailed print setting screen, and opens a print setting screen for the print queue designated with the control 310. The finish button 313 is a button for terminating the poster data creation application 314, and is a button which the user selects in a case of terminating the poster data creation application 314.

The description now returns to FIG. 2. The application 202 (poster data creation application 314) issues a print instruction to the OS 201 in a case of receiving a print request from the user. In response to receiving the print instruction, the OS 201 then lets its OS printing system not illustrated handle the processing for the printing. Here, the OS printing system operates in cooperation with the printer driver 203.

Figure 4A:
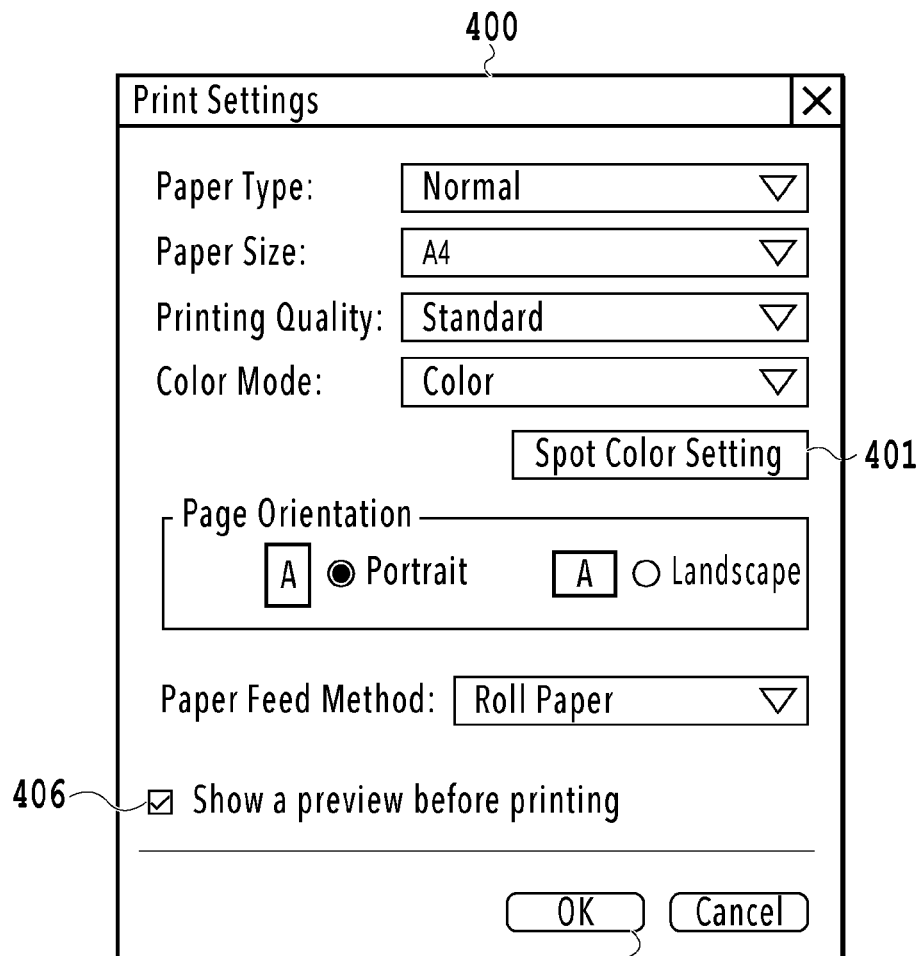
FIG. 4A is a view illustrating a print setting dialogue.
Figure 4B:
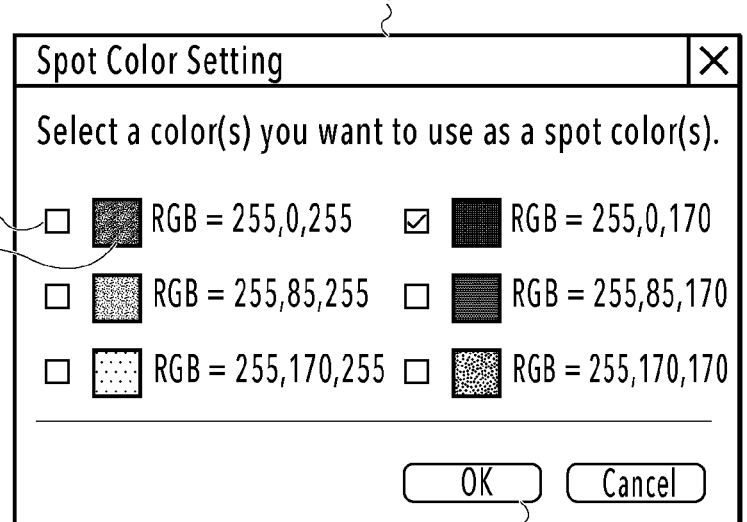
FIG. 4B is a view illustrating a spot color setting screen.

FIGS. 4A and 4B are views illustrating a print setting dialogue 400 and a spot color setting screen 402. FIG. 4A illustrates the print setting dialogue 400 as a setting screen of the printer driver 203. FIG. 4B illustrates the spot color setting screen 402.

In a case where the printer driver 203 (see FIG. 2) receives an instruction to activate a print setting screen from the application 202 via the OS printing system, the user interface unit 204 controls display so as to display the print setting dialogue 400. The user can obtain a desired print product from the printing apparatus 102 by configuring various print settings on the print setting dialogue 400. A button 401 is a button for opening a detailed spot color setting screen. Performing an operation of selecting and clicking (hereinafter referred to also as "pressing") the button 401 will open the spot color setting screen 402 illustrated in FIG. 4B.

The spot color setting screen 402 displays the RGB values corresponding to the plurality of predetermined spot colors, display colors 404 corresponding to those RGB values, and checkboxes 403 for configuring settings on whether to print the RGB values as the spot colors. In other words, the checkboxes 403 are each a region for receiving a selection on whether to enable spot color printing for printing pixels with the RGB value corresponding to the spot color in the spot color. Here, assume that there are displayed at least a region for receiving a selection on whether to enable spot color printing for printing pixels with the first specific color value in the corresponding spot color, and a region for receiving a selection on whether to enable spot color printing for printing pixels with the second specific color value in the corresponding spot color. In the following description, a state where "a spot color is enabled" is equivalent to a state where "spot color printing for printing pixels with the RGB value corresponding to the spot color in the spot color is enabled".

Note that in a case where spot color printing is not enabled, that is, a checkbox 403 is not checked, pixels with the RGB value corresponding to the spot color will be printed in a color other than the spot color. Thus, the above region can be seen as a region for receiving a setting on whether to print pixels with the specific RGB value in the spot color or in a color different from the spot color. The region can also be seen as, for example, a region for receiving a setting on whether to perform printing by using the spot color ink or to perform printing not by using the spot color ink but by using a normal ink(s).

Also, in the present embodiment, a checkbox 403 is prepared for each of the plurality of spot colors. For each of the plurality of types of spot color printing, it is possible to set whether to enable or disable the spot color printing. Thus, the checkboxes 403 include, for example, a region for receiving a selection on whether to enable spot color printing for printing pixels with the RGB value corresponding to fluorescent pink in fluorescent pink (fluorescent pink spot color printing). The checkboxes 403 also include, for example, a region for receiving a selection on whether to enable spot color printing for printing pixels with the RGB value corresponding to orange in orange (orange spot color printing).

With this spot color setting screen 402, the user can visually recognize the plurality of designatable spot colors and select a color(s) to be used as a spot color(s). Moreover, preparing individual checkboxes makes it possible to configure, for example, such a setting that fluorescence pink spot color printing is enabled but orange spot color printing is disabled. FIG. 4B represents a setting for printing an RGB value of R=255, G=0, and B=170 as a spot color. The checkbox 403 with R=255, G=0, and B=170 is checked, thereby enabling the corresponding spot color printing.

In a case where the user then presses an OK button 405 in the spot color setting screen 402, the setting screen of the printer driver 203 is closed, and the application 202 (see FIG. 2) is notified of the print settings. The application 202 then issues a print instruction. In a case where the print data generated by the printer driver 203 contains the RGB value (R=255, G=0, B=170), the printing apparatus 102 will perform printing using the spot color ink.

In a case where the checkbox 403 in the spot color setting screen 402 has not been checked, then, even if the print data generated by the printer driver 203 contains the corresponding RGB value (R=255, G=0, B=170), the printing apparatus 102 will not use the spot color ink. In that case, the printing apparatus 102 will uses normal inks to form the images of the portions with the corresponding RGB value.

FIG. 5 is a diagram illustrating the RGB values corresponding to the spot colors and corresponding commands in the form of a table. The printer driver 203 holds these pieces of information on the RGB values corresponding to the spot colors and the corresponding commands.

In the present embodiment, an example has been presented in which the fluorescence pink ink is used to print the corresponding RGB value in the fluorescent spot color. However, a spot color using another special color ink, such as silver or gold, may be assigned to any RGB value.

Incidentally, in the present embodiment, in a case where the user wishes to execute spot color printing, the user needs to set the RGB value corresponding to the spot color for the object desired to be printed with the spot color ink on the editing screen of the poster data creation application 314.

Then, on the setting screen of the printer driver 203, the user needs to enable the spot color printing corresponding to the RGB value set for the object.

Here, there is a case where the user, for example, sets the RGB value corresponding to the spot color for the object desired to be printed with the spot color ink on the editing screen of the poster data creation application 314 but forgets to enable the spot color printing corresponding to the this RGB value on the setting screen of the printer driver 203. This leads to Problem 1 that the user wishes the object to be printed in the spot color but the object ends up being printed in a process color.

Also, there is a case where the user unintentionally sets the RGB value corresponding to a spot color for an object which the user does not wish to be printed in that spot color. This is due to, for example, that a photographic image or the like contains a variety of colors and may therefore contain the normal color corresponding to the same RGB value as that corresponding to the spot color. This leads to Problem 2 that the user wishes the object not to be printed in the spot color (wishes the object to be printed in a process color) but the object ends up being printed using the spot color.

Thus, in the present embodiment, control for solving the above problems is executed. Note that one of control for solving Problem 1 or control for solving Problem 2 may be executed to solve only one of the problems.

Figure 6:
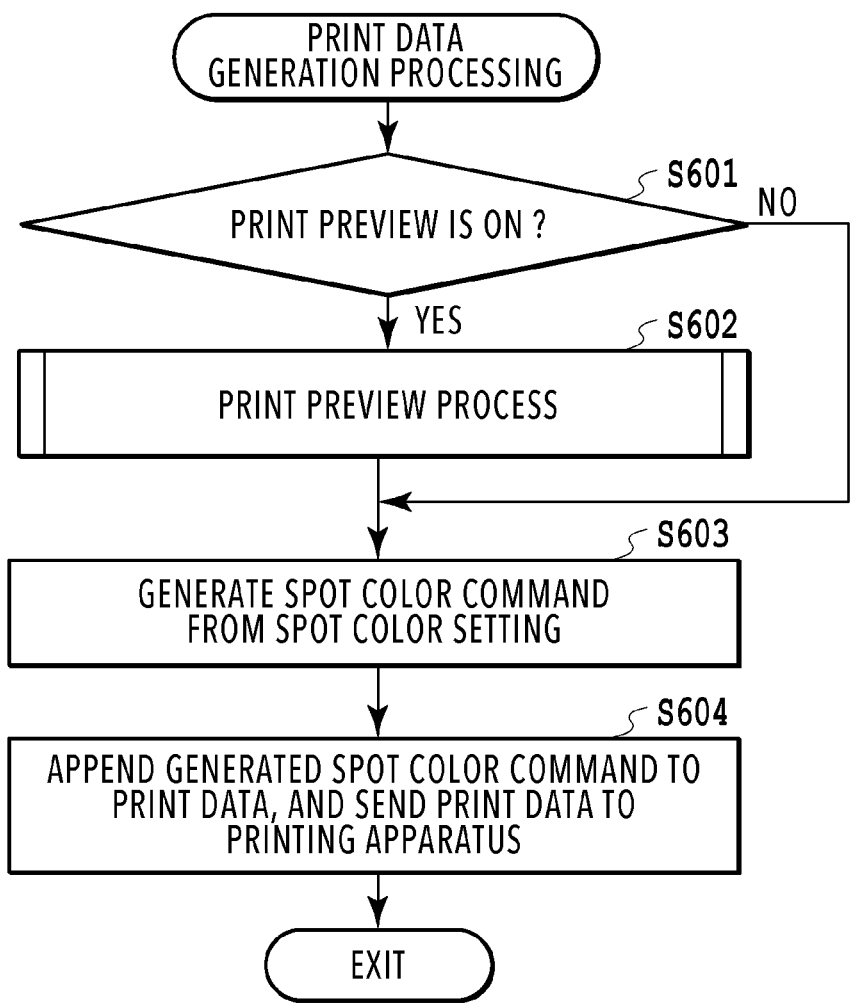
FIG. 6 is a flowchart illustrating print data generation processing.

FIG. 6 is a flowchart illustrating print data generation processing in the present embodiment. In a case where the print button 311 of the poster data creation application 314 is pressed after setting each control in the print setting dialogue 400 (see FIG. 4A), the print settings are transferred to the graphic processing unit 205 (see FIG. 2) via the OS printing system. Then, based on those print settings, the print data generation processing is executed.

The print data generation processing in the present embodiment will be described below with reference to the flowchart of FIG. 6. Note that the CPU 111 in the host computer 101 performs the series of processes illustrated in FIG. 6 by loading program code stored in the ROM 112 to the external storage apparatus 114 and executing it. Alternatively, the functions of some or all of the steps in FIG. 6 may be implemented with hardware such as an ASIC or an electronic circuit. Meanwhile, the symbol "S" in the description of each process means a step in the flowchart.

In response to pressing the print button 311, thereby starting the print data generation processing, in S601, the graphic processing unit 205, under control of the CPU 111, refers to the print settings transferred via the OS printing system and checks whether a setting for displaying a print preview is enabled. This is done based on the state of a checkbox 406 in the print setting dialogue 400. The graphic processing unit 205 proceeds to S602 if the checkbox is checked, and proceeds to S603 if the checkbox is not checked. The processing in a subroutine of S602 will be described later.

Thereafter, in S603, based on the spot color setting 402, the graphic processing unit 205, under control of the CPU 111, generates a command for printing pixels with the selected RGB value(s) in the corresponding spot color(s) (a command corresponding the instruction information mentioned earlier). Then, in S604, under control of the CPU 111, the command designating the spot color(s) is appended to print data obtained by converting the image to be printed into a format which the printing apparatus 102 can recognize, and the resultant print data is sent to the printing apparatus 102. In other words, the CPU 111 sends special color information to the printing apparatus 102.

Note that not only the printer driver 203 but also the printing apparatus 102 manages information as illustrated in FIG. 5 at least indicating the association between each type of spot color printing and the corresponding command for enabling the spot color printing. Thus, based on the received command, the printing apparatus 102 can identify the RGB value(s) for spot color printing. Print data is generated by a series of processes as described above. Note that the print data is generated without generating or adding the above-described command in a case where no spot color printing is enabled in the spot color setting 402.

FIGS. 7A to 7C are diagrams illustrating examples to the command to be appended. For example, in a case where R=255, G=0, and B=255 are designated as a spot color, the command illustrated in FIG. 7A is appended to the print data. In a case where R=255, G=0, and B=170 are designated as a spot color, the command illustrated in FIG. 7B is appended to the print data. In a case where R=255, G=0, and B=255 and R=255, G=0, and B=170 are both designated as spot colors, a command representing the logical sum of both of the bit flags in FIGS. 7A and 7B is appended to the print data, as illustrated in FIG. 7C. In this way, a plurality of spot colors are designated with a single command. Such commands are provided for at least the number of spot colors as illustrated in FIG. 5. In addition, commands designating a plurality of spot colors, like the one in FIG. 7C, may be provided as appropriate depending on whether spot colors are combined and/or the number of spot colors designatable with a single command.

Figure 8:
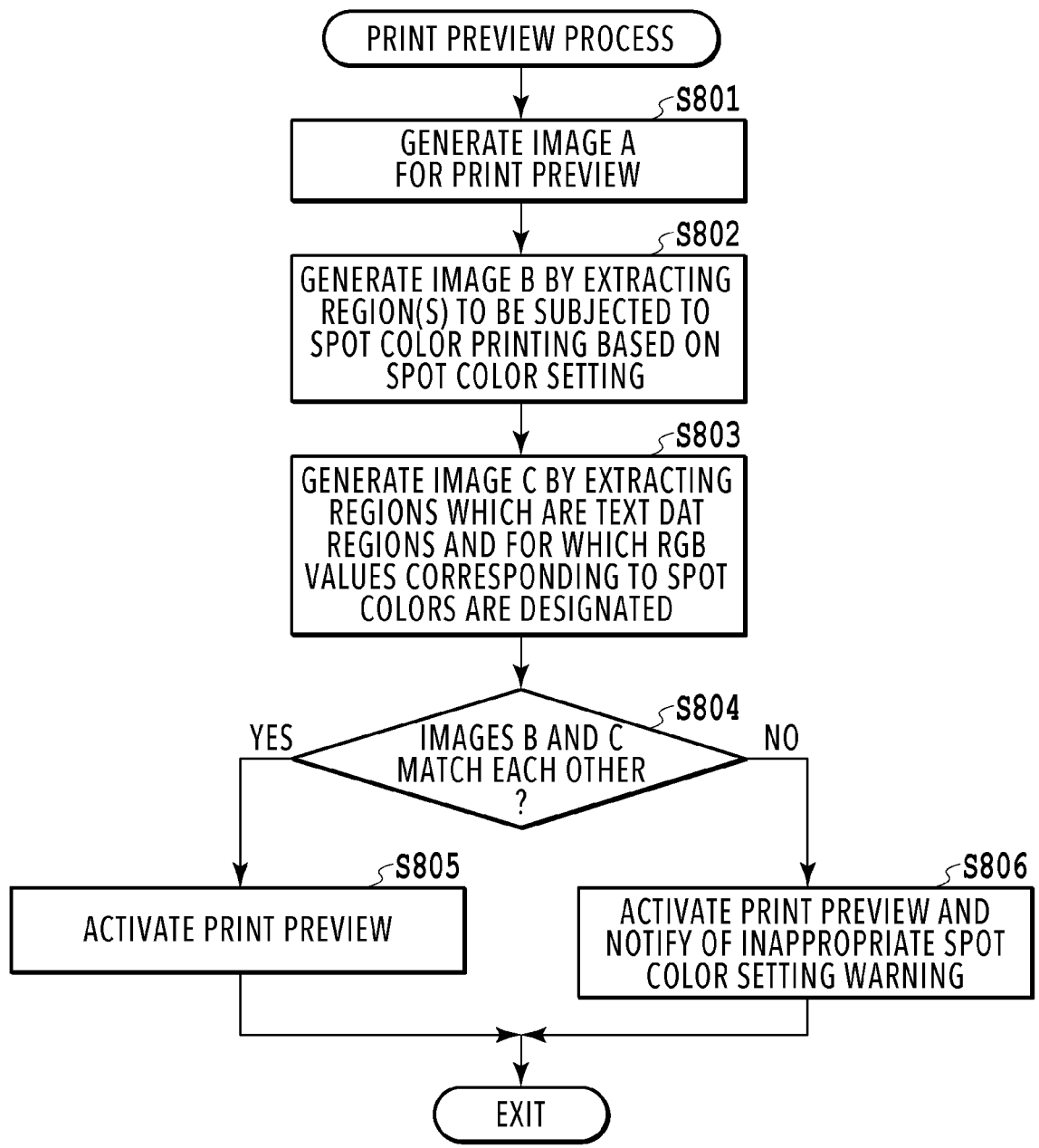
FIG. 8 is a flowchart illustrating print preview process.

FIG. 8 is a flowchart illustrating the print preview process in S602, which is a subroutine in the print data generation processing in FIG. 6. S602 is a process performed in the case where, in the determination process in S601, the graphic processing unit 205 refers to the print settings and determines that the setting for displaying a print preview is enabled (print preview: ON).

Note that the print preview process in S602 may be executed in a case where a preview button (not illustrated) for displaying a print preview is pressed.

The print preview process in the present embodiment will be described below with reference to the flowchart of FIG. 8. Note that the CPU 111 in the host computer 101 performs the series of processes illustrated in FIG. 8 by loading program code stored in the ROM 112 to the external storage apparatus 114 and executing it. Alternatively, the functions of some or all of the steps in FIG. 8 may be implemented with hardware such as an ASIC or an electronic circuit. Meanwhile, the symbol "S" in the description of each process means a step in the flowchart.

In response to starting the print preview process, in S801, the graphic processing unit 205, under control of the CPU 111, generates an image for a print preview (preview image) (hereinafter referred to as "image A") from the print data and print settings transferred via the OS printing system. Specifically, the image A is an image in which a region set at the RGB value corresponding to a spot color enabled on the spot color setting screen 402 is expressed in the spot color. Also, the image A is an image in which a region set at the RGB value corresponding to a spot color disabled on the spot color setting screen 402 is expressed in a process color. Moreover, the image A is an image in which a region set at an RGB value not corresponding to any of the spot colors is expressed in a process color. In sum, the image A is an image which, in a case where the print data has been sent to the printing apparatus 102 with the current print settings, represents a print result that will be output from the printing apparatus 102 based on this print data. Then, in S802, under control of the CPU 111, the graphic processing unit 205 generates an image (hereinafter referred to as "image B") from the spot color setting contained in the print settings transferred via the OS printing system and the print data, the image B being generated by extracting only the region(s) to be subjected to spot color printing. Here, the graphic processing unit 205 extracts only the region(s) to be printed in the spot color(s) enabled in the spot color setting among the plurality of spot colors which can be enabled and disabled on the spot color setting screen 402. Moreover, the graphic processing unit 205 does not extract the region(s) to be printed in the spot color(s) not enabled in the spot color setting. Also, the extraction targets include text data regions and background regions. A text data region (text region) is a region to print any text entered by the user on the application 202 and is a region set on a background region. A background region is a region to print any background image selected by the user on the application 202. For example, in a case where the spot color setting is what is illustrated in FIG. 4B, the region(s) to be extracted as the image B is(are) a region(s) within the content where the RGB value of each pixel is R=255, G=0, and B=170.

Then, in S803, under control of the CPU 111, the graphic processing unit 205 extracts the regions which are text data regions and set at the RGB values corresponding to the spot colors (see FIG. 5) from the print data transferred via the OS printing system. Here, the graphic processing unit 205 extracts the region(s) set at the RGB value(s) corresponding to the enabled spot color(s) among the plurality of spot colors which can be enabled and disabled on the spot color setting screen 402. Moreover, the graphic processing unit 205 also extracts the region(s) set at the RGB value(s) corresponding to the disabled (not enabled) spot color(s). Note that the extraction targets are not limited to text data regions and may be graphic data regions. Note that text data regions and graphic data regions are non-background regions. Which region is a background region and which region is a text data region can be determined from information contained in the print data. The graphic processing unit 205 generates the extracted image (hereinafter referred to as "image C"). Specifically, the regions extracted as the image C are regions with a character(s) (text) in the content created on the poster data creation application 314 each of which is designated with one of the six designated RGB values illustrated in FIG. 5. Thus, in the case of, for example, a content as illustrated in FIGS. 3A and 3B, the region with the characters "SALE" designated with R=255, G=0, and B=255, and the region with the characters "UP TO 50% OFF" designated with R=255, G=0, and B=170 meet the above definition. Also, in the printing system, the RGB values extracted as the image C are identified as color values recommended to be used in spot color printing, and the spot color settings corresponding to these RGB values are held as recommended spot color settings (recommended setting derivation unit).

Note that the order of the processes in S801 to S803 is not limited to the one illustrated in FIG. 8.

Here, the images B and C will be described by taking a specific example. Assume, for example, that characters are formed with the RGB value corresponding to a spot color but the user forgets to check the checkbox in the spot color setting (FIG. 4B) and the spot color is therefore not designated. In this case, nothing is displayed in the image B since nothing is designated in the spot color setting. In the image C, however, the characters are displayed since the characters are formed with the RGB value corresponding to the spot color. In sum, in a case where settings have a possibility of not being correct such as a case where the user has formed characters with the RGB value corresponding to a spot color in an attempt to print the characters in the spot color but has forgotten to designate the spot color in the spot color setting, a difference appears between the images B and C.

Referring back to the flowchart of FIG. 8, in S804, under control of the CPU 111, the graphic processing unit 205 compares the images B and C and determines whether the images B and C match each other. The graphic processing unit 205 proceeds to S805 if the images B and C match each other (Yes in the determination in S804). In S805, the graphic processing unit 205 instructs the print preview unit 208 to activate a print preview. Note that a notification as made in S806 is not made in this step. The graphic processing unit 205 proceeds to S806 if the result of the comparison between the images B and C in S804 (comparison result) indicates that the images B and C do not match each other (No in the determination in S804). In S806, the graphic processing unit 205 instructs the print preview unit 208 to active the print preview additionally with information indicating that the spot color setting has a possibility of being inappropriate. This can be implemented by, for example, appending a specific value as an activation parameter at the time of issuing the instruction to activate the print preview. However, this is not necessarily the only way to convey the information.

With the above processes, it is possible to, for example, detect whether a region to be printed in a spot color enabled in the spot color setting is included in a background region. Moreover, it is possible to, for example, detect whether a region set at the RGB value corresponding to a spot color not enabled in the spot color setting is included in a text data region.

Figure 9A:
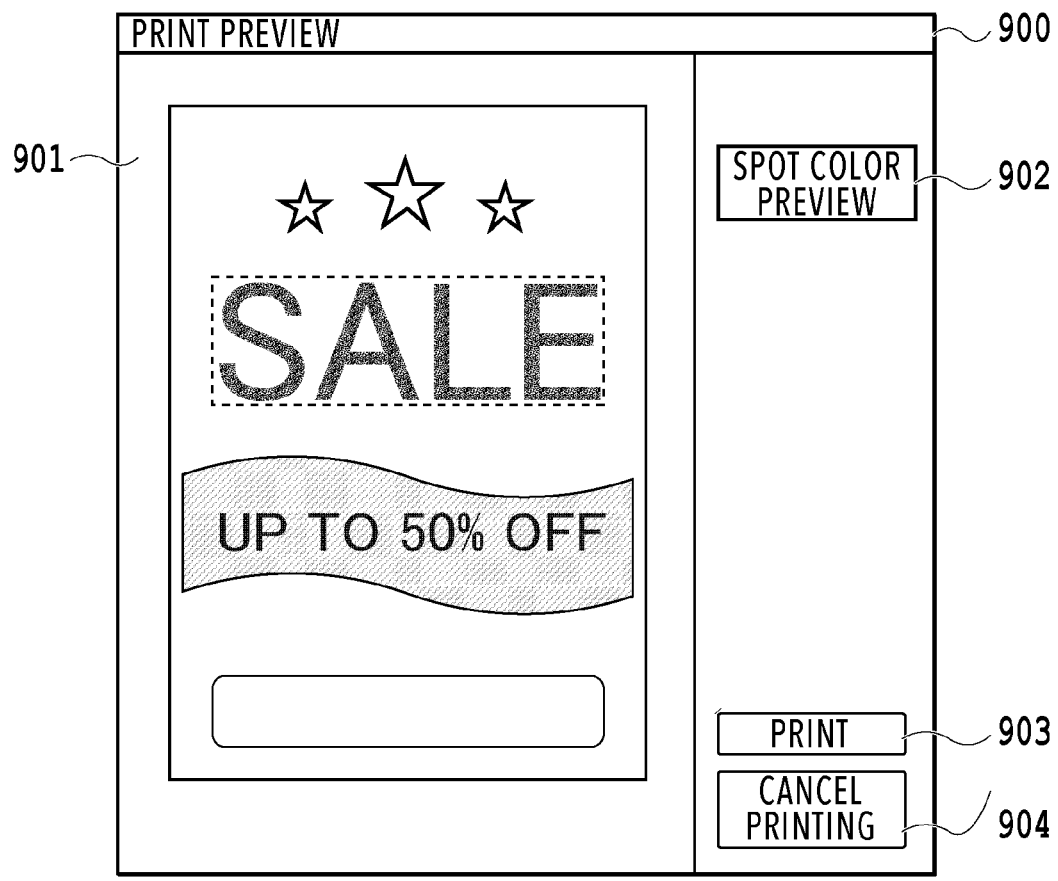
FIG. 9A is a view illustrating an example screen of a print preview.
Figure 9B:
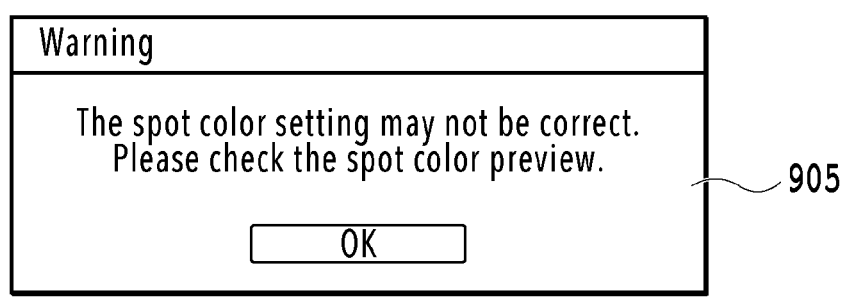
FIG. 9B is a view illustrating an example screen of a message dialogue.

FIG. 9A is a view illustrating an example screen of a print preview 900. FIG. 9B is a view illustrating an example screen of a message dialogue 905. FIG. 9A represents an example of the print preview 900 displayed by the print preview unit 208. The print preview 900 includes a print preview display region 901, a spot color preview button 902, a print button 903, and a print cancel button 904.

The print preview unit 208 displays the print preview 900 on the display unit 119 based on the print preview activation instruction in S805 or S806 in the flowchart of FIG. 8. Here, the image A generated in S801 is displayed in the print preview display region 901. In the image A, even in a case where a spot color is designated in the spot color setting, it is displayed in the color of its RGB value. The user can recognize a general representation of the print result by checking the display of the image A on the print preview 900. In a case where the user wishes to proceed to printing of this content with the printing apparatus 102, the user can select the print button 903. In a case where the user does not wish to proceed to the printing, the user can select the print cancel button 904. In the case where the print button 903 is selected, the processing proceeds to S603 in the flowchart of FIG. 6, and the processes in S603 and the subsequent step are performed as described earlier.

Also, in the case where the print preview unit 208 is notified in S806 of information indicating that the spot color setting has a possibility of being inappropriate, the message dialogue 905 is displayed along with the display of the print preview 900. The displaying of the message dialogue 905 (see FIG. 9B) corresponds to a process of notifying the user. The message dialogue 905 displays information indicating that the spot color setting has a possibility of being inappropriate (the spot color setting has a possibility of not being correct), and information recommending checking a spot color preview to be described later. In this way, the notification can be made, for example, in a case where a region to be printed in a spot color enabled in the spot color setting (spot color printing region) is included in a background region. Moreover, the notification can be made, for example, in a case where a region set at the RGB value corresponding to a spot color not enabled in the spot color setting is included in a text data region. In sum, the notification is made in a case where a spot color printing region is included in a predetermined region other than a text region.

Figure 10A:
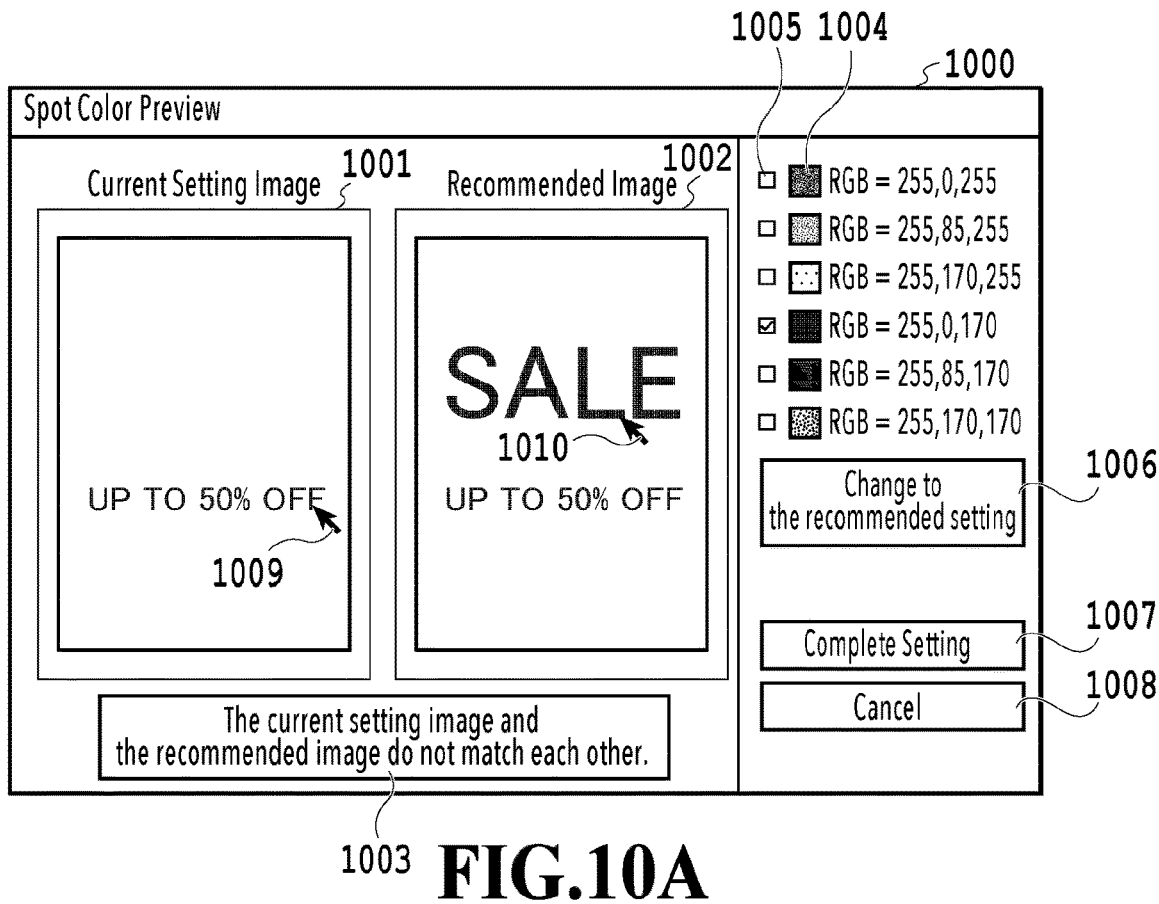
FIG. 10A is a view illustrating an example screen of a spot color preview.

FIG. 10A is a view illustrating an example screen of a spot color preview 1000. The spot color preview 1000 is displayed in a case where the spot color preview button 902 in FIG. 9A is pressed. The spot color preview 1000 includes a spot color preview display region 1001, a recommended spot color preview display region 1002, and a preview message 1003. The spot color preview 1000 further includes the RGB values corresponding to the plurality of predetermined spot colors, display colors 1004 corresponding to those RGB values, and checkboxes 1005 for configuring settings on whether to print the RGB values as the spot colors. The spot color preview 1000 also includes a recommended setting apply button 1006, a setting complete button 1007, and a cancel button 1008. Here, "SALE" is formed with RGB=255, 0, 255, and "UP TO 50% OFF" is formed with RGB=255, 0, 170.

When the spot color preview 1000 is displayed as a result of pressing the spot color preview button 902, the image B generated in S802 is displayed in the spot color preview display region 1001. Also, the checkboxes 1005 are displayed so as to reflect the contents of the spot color setting at the time of generating the image B in S802. Here, the checkbox 1005 with RGB=255, 0, 170 is checked. By checking the display contents of the spot color preview display region 1001 and the states of the checkboxes 1005, the user can recognize which region(s) in the created image is(are) to be subjected to spot color setting with the current spot color printing.

When the spot color preview 1000 is displayed, the image C generated in S803 is displayed in the recommended spot color preview display region 1002. The user can visually compare the display in the recommended spot color preview display region 1002 and the display in the spot color preview display region 1001 arranged next to each other. The visual comparison makes it possible to realize that the spot color setting has a possibility of not being correct in a case where there is a difference between the region(s) to be subjected to spot color printing with the current spot color setting and the region(s) to be subjected to spot color printing with the spot color setting recommended by the printing system. Also, in a case where the user selects the recommended setting apply button 1006, the spot color setting is changed to the contents of the recommended spot color setting at the time of generating the image C in S803.

In the spot color preview 1000 in FIG. 10A, the spot color for "SALE" is not set since the user has not checked the checkbox 403 with RGB=255, 0, 255 in the spot color setting (see FIG. 4B). Thus, "SALE" is not displayed in the image B.

Figure 10B:
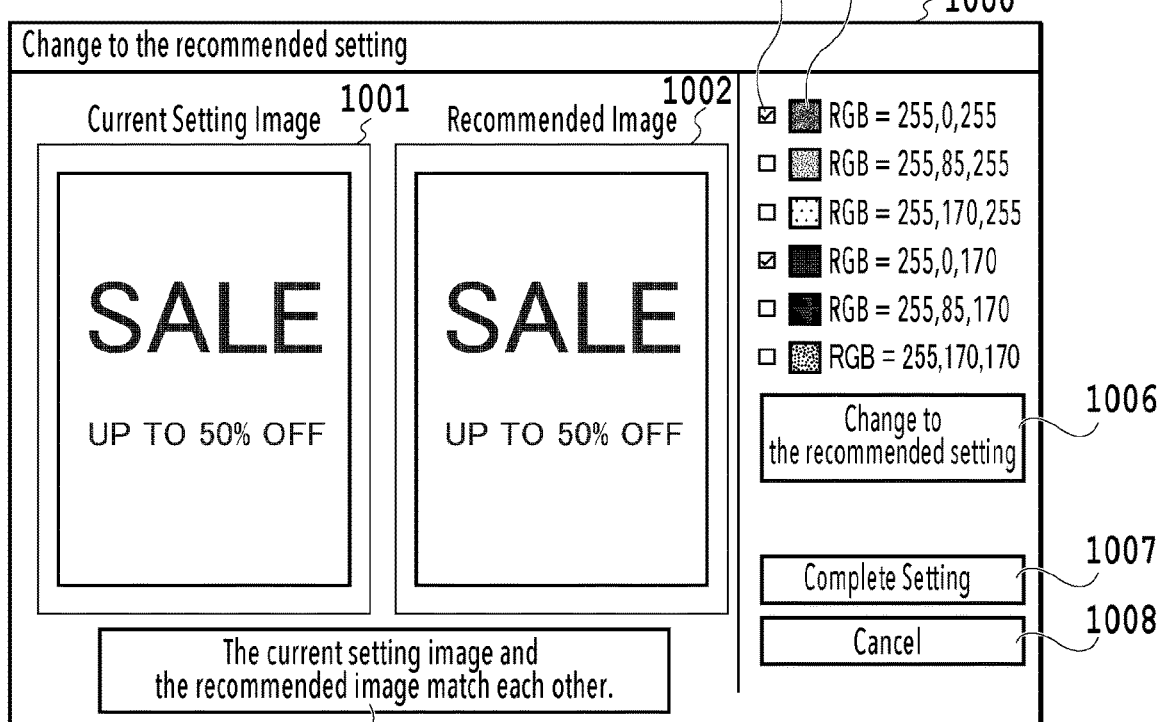
FIG. 10B is a view illustrating the example screen of the spot color preview.

FIG. 10B is a display screen of the spot color preview 1000 displayed in a case where the recommended setting apply button 1006 is pressed. The contents of the recommended spot color setting are applied to and displayed on the checkboxes 1005 as the spot color setting. Moreover, the same image as that displayed in the recommended spot color preview display region 1002 is displayed in the spot color preview display region 1001.

The displayed preview message 1003 is switched based on whether the image displayed in the spot color preview display region 1001 and the image displayed in the recommended spot color preview display region 1002 match each other. In a case where the images do no match each other, an indication of the mismatch as illustrated in the preview message 1003 in FIG. 10A is displayed. In a case where the images match each other, an indication of the match as illustrated in the preview message 1003 in FIG. 10B is displayed.

On the spot color display region 1001 in FIG. 10A, a cursor 1009 of the pointing device 117 is pointed at the character region "UP TO 50% OFF". Also, on the recommended spot color display region 1002 in FIG. 10A, a cursor 1010 of the pointing device 117 is pointed at the character region "SALE". Note that the cursors 1009 and 1010 are displayed simultaneously in FIG. 10A to clarify the visual representation. The cursors 1009 and 1010 are not displayed simultaneously, and one of them is displayed.

Figure 11A:
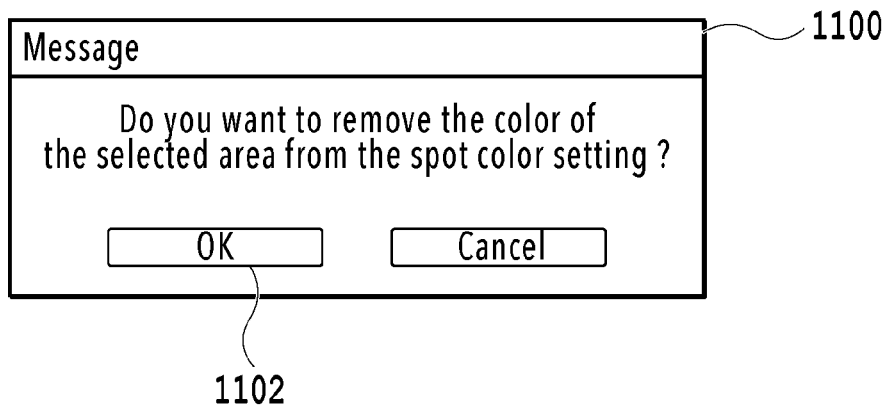
FIG. 11A is a view illustrating a message.
Figure 11B:
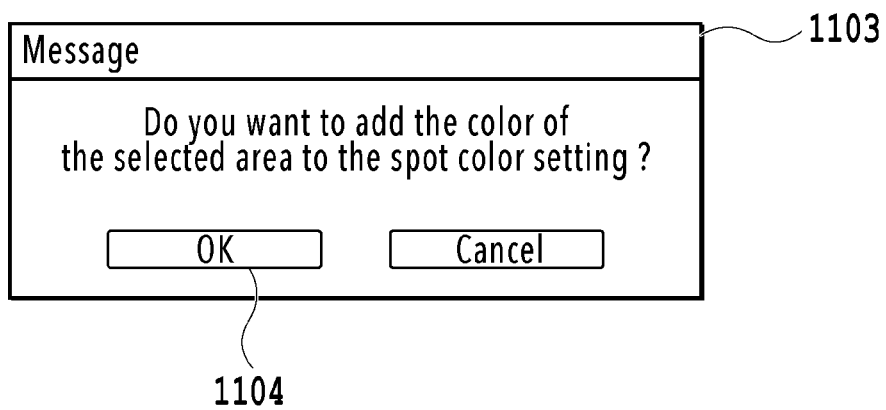
FIG. 11B is a view illustrating a message.

FIGS. 11A and 11B are views each illustrating a message displayed in a case of performing a click operation on the display screen of the spot color preview 1000. A message 1100 in FIG. 11A is displayed in a case of moving the cursor 1009 on the spot color preview display region 1001 to the region to be subjected to spot color printing, pointing the cursor 1009 at a character "F", and clicking the character with the pointing device 117. An OK button 1102 in the message 1100 is configured be capable of changing the corresponding part of the spot color setting by being pressed by the user. In a case where the user presses the OK button 1102 in the message 1100, the spot color setting is changed such that spot color printing will not be performed on R=255, G=0, and B=170, which are the RGB value of the region clicked with the cursor 1009.

A message 1103 in FIG. 11B is displayed in a case of moving the cursor 1010 on the recommended spot color preview display region 1002 to the region to be subjected to spot color printing, pointing the cursor 1010 at the character "L", and clicking the character. Then, in a case where the user presses an OK button 1104, the corresponding part of the spot color setting is changed such that spot color printing will be performed on R=255, G=0, and B=255, which are the RGB value of the region clicked with the cursor 1010.

In a case where the setting complete button 1007 is pressed, the spot color setting is set with the content of the selected checkbox(es) 1005 displayed in the spot color preview 1000, and the screen of the spot color preview 1000 is closed. Thereafter, the display returns to the print preview 900 (see FIG. 9A). In a case where the print button 903 is pressed (a print instruction is issued), spot color printing is executed based on the contents of the spot color setting selected in the spot color preview 1000. On the other hand, in a case where the cancel button 1008 is pressed, the contents obtained by changing the selection of the checkboxes 1005 after the activation of the spot color preview 1000 are discarded, and the display returns to the print preview 900.

Figure 12:
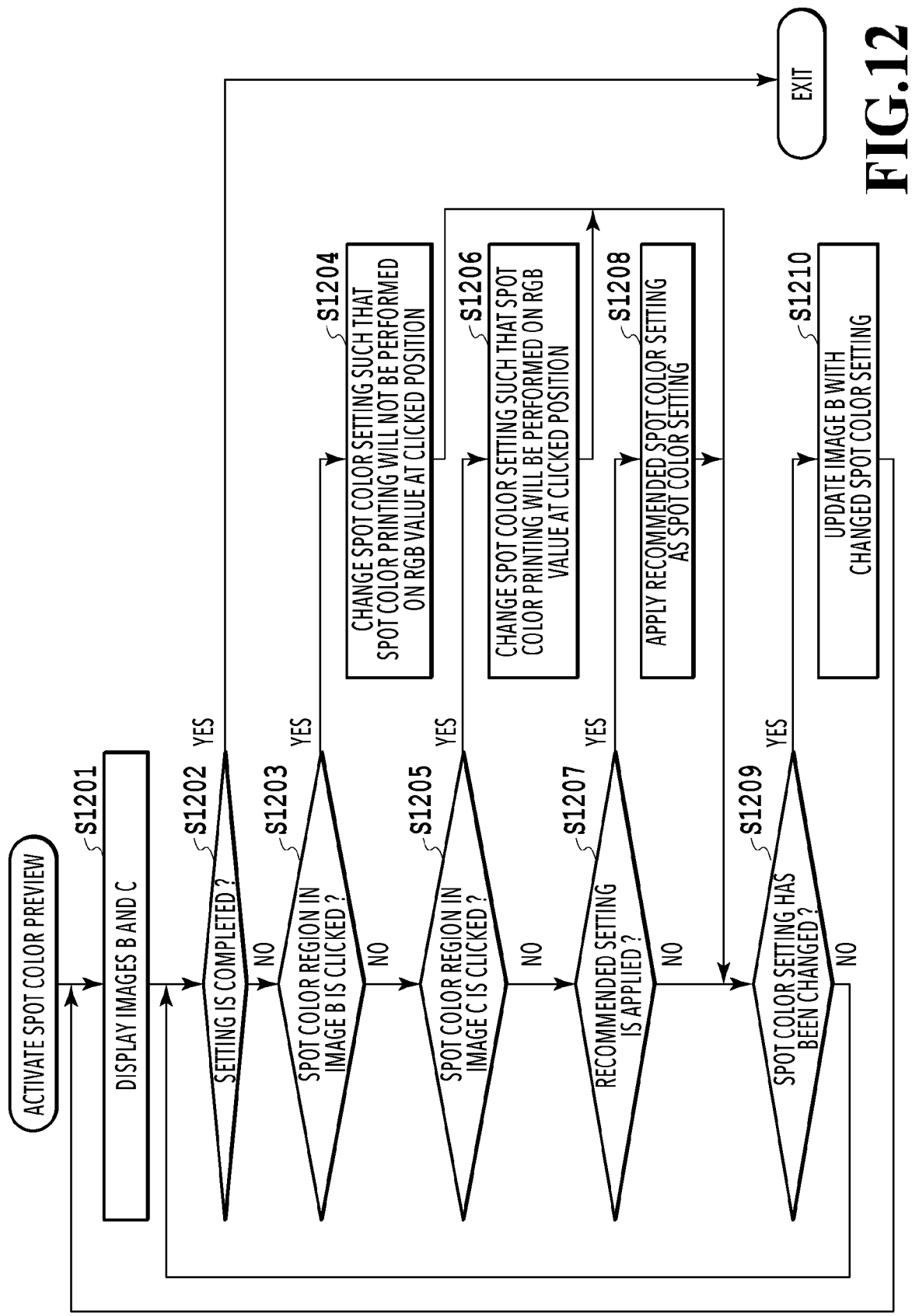
FIG. 12 is a flowchart illustrating spot color preview process.

FIG. 12 is a flowchart illustrating a spot color preview process. The spot color preview process is started by the print preview unit 208 in a case where the spot color preview button 902 in the print preview 900 (see FIG. 9A) is pressed. Also, the spot color preview 1000 is displayed as the display screen in response to pressing the spot color preview button 902. The spot color preview process in the present embodiment will be described below with reference to the flowchart of FIG. 12. Note that the CPU 111 in the host computer 101 performs the series of processes illustrated in FIG. 12 by loading program code stored in the ROM 112 to the external storage apparatus 114 and executing it. Alternatively, the functions of some or all of the steps in FIG. 12 may be implemented with hardware such as an ASIC or an electronic circuit. Meanwhile, the symbol "S" in the description of each process means a step in the flowchart.

In response to starting the spot color preview process, in S1201, the print preview unit 208 displays the images B and C under control of the CPU 111. This is done by displaying the images B and C in the spot color preview display region 1001 and the recommended spot color preview display region 1002 in the spot color preview 1000, respectively. Then, in S1202, under control of the CPU 111, the print preview unit 208 checks whether the setting complete button 1007 is pressed by the user. The print preview unit 208 terminates the processing in the flowchart of FIG. 12 if the button is pressed. The print preview unit 208 proceeds to S1203 if the button is not pressed.

In S1203, under control of the CPU 111, the print preview unit 208 checks whether a click operation is performed with the pointing device 117 on the image B displayed in the spot color preview display region 1001. If a click operation is performed, then in S1204, the print preview unit 208 extracts the RGB value of the pixel in the image B at the coordinates at which the cursor 1009 was placed at the time of performing the click operation, and changes the spot color setting such that spot color printing will not be performed on this RGB value. The print preview unit 208 then proceeds to S1209. If determining in S1203 that no click operation is performed, the print preview unit 208 proceeds to S1205.

In S1205, under control of the CPU 111, the print preview unit 208 checks whether a click operation is performed with the pointing device 117 on the image C displayed in the recommended spot color preview display region 1002. If a click operation is performed, then in S1206, the print preview unit 208 extracts the RGB value of the pixel in the image C at the coordinates at which the cursor 1010 was placed at the time of performing the click operation with the pointing device 117. Then, the print preview unit 208 changes the spot color setting such that spot color printing will be performed on this RGB value. The print preview unit 208 then proceeds to S1209. If determining in S1205 that no click operation is performed, the print preview unit 208 proceeds to S1207.

In S1207, under control of the CPU 111, the print preview unit 208 checks whether the recommended setting apply button 1006 is pressed by the user and, if the button is pressed, changes the spot color setting to the contents of the recommended spot color setting in S1208. The print preview unit 208 then proceeds to S1209. If determining in S1207 that the recommended setting apply button 1006 is not clicked by the user, the print preview unit 208 proceeds to S1209.

In S1209, under control of the CPU 111, the print preview unit 208 checks whether the spot color setting has been changed. This is to check whether the spot color setting has been changed by the process in any one of S1204, S1206, and S1208 described above. If the spot color setting has been changed, then in S1210, the print preview unit 208, under control of the CPU 111, re-generates an image (image B) by extracting only the region(s) in the print data to be subjected to spot color printing with the contents of the changed spot color setting via the graphic processing unit 205. Subsequently, the print preview unit 208 brings the processing back to S1201 and updates the display contents of the spot color preview display region 1001 with the re-generated image B.

If determining in S1209 that the spot color setting has not been changed, the print preview unit 208 returns to S1202 and checks again whether the setting is completed. The print preview unit 208 repeats the processing from S1203 if the setting is not completed, and terminates the processing if the setting is completed.

As described above, in the present embodiment, a recommended spot color setting is derived for a content prepared by the user and, in a case where a spot color setting different from the derived setting is set, the user is notified before the execution of the printing that the settings are different with a notification screen in a print preview. Also, with the spot color preview, the user can compare the region(s) to be subjected to spot color printing with the current spot color setting and the region(s) to be subjected to spot color printing with the recommended spot color setting, and also change the spot color setting while checking the display. These advantageous effects make it possible to implement an information processing apparatus, control method, and storage medium capable of preventing an unintended print result from being produced.

Note that, in the description of the present embodiment, the print data generation processing proceeds to S602 in the case where the checkbox 406 in the print setting dialogue 400 is checked. However, the processing is not limited to this. That is, the print preview process may be performed even without the checkbox 406 checked. Then, an inappropriate setting notification may be made in the case where the images B and C do not match each other.

Other Embodiments

Details of FIG. 8 are not limited to those described above. For example, in S804, a determination as below may be made instead of what was described above. For example, in the flowchart of FIG. 8, an image (hereinafter referred to as "image D") may be generated by extracting, from the print data, the region(s) which is(are) a text data region(s) and to be printed in the spot color(s) enabled in the spot color setting among the plurality of spot colors which can be enabled and disabled on the spot color setting screen 402. Moreover, instead of the determination in S804 described above, a determination process A may be performed to compare the images B and D and determine whether the images B and D match each other. This makes it possible to, for example, detect whether a region to be printed in a spot color enabled in the spot color setting is included in a background region. Note that, in the determination process A, whether a region to be printed in a spot color enabled in the spot color setting is included in a background region may be determined by, for example, a method other than comparing the images B and D. For example, the determination process A may be executed by identifying a background region and determining whether a region to be printed in a spot color enabled in the spot color setting is included in the identified region.

Moreover, in the flowchart of FIG. 8, a determination process B, for example, may be performed to compare the images C and D and determine whether the image C and D match each other. In this way, it is possible to, for example, detect whether a region set at the RGB value corresponding to a spot color not enabled in the spot color setting is included in a text data region. In other words, it is possible to detect whether there is a spot color that has a possibility of having been forgotten to be enabled in the spot color setting. Note that, in the determination process B, whether a region set at the RGB value corresponding to a spot color not enabled in the spot color setting is included in a text data region may be determined by, for example, a method other than comparing the images C and D. For example, the determination process B may be executed by identifying a text data region and determining whether a region set at the RGB value corresponding to a spot color not enabled in the spot color setting is included in the identified region.

Furthermore, in a case where the result of the determination process A is NO, S806 is executed. While the message dialogue 905 may be displayed as a notification A made in this step, a different notification may be made instead. For example, a message for notifying the user that the region to be printed in the spot color is included in a background image may be displayed. Also, in a case where the result of the determination process B is NO, S806 is executed. While the message dialogue 905 may be displayed as a notification B to be made in this step, a different notification may be made instead. For example, a notification different from the notification A may be made, and a message for notifying the user that there is a spot color that has a possibility of having been forgotten to be enabled in the spot color setting may be displayed. Moreover, for example, a message for notifying the user that a region set at the RGB value corresponding to a spot color not enabled in the spot color setting is included in a text data region may be displayed. In a case where the results of the determination processes A and B are both YES, neither the notification A nor B is made, and S805 is executed.

Also, the configuration may be such that one of the above-described determination processes A and B is executed. In that case, if the result of one of the determination processes A and B is YES, neither the notification A nor B is made and S805 is executed.

The present invention can be implemented by providing a program that implements one or more of the functions of the above embodiment to a system or an apparatus via a network or a storage medium, and causing one or more processors in a computer of the system or the apparatus to read out and execute the program. Alternatively, the present invention can be implemented with a circuit (e.g., ASIC) that implements one or more of the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-202181 filed Dec. 14, 2021, which is hereby incorporated by reference wherein in its entirety.

What is claimed is:

1. A method of controlling an information processing apparatus, the control method comprising:
   obtaining print data; and
   making a predetermined notification based on a fact that a special color printing region, set to be printed in a special color, is included in a predetermined region in a region to be printed based on the print data, the predetermined region being a region other than a text region in the region to be printed based on the print data, wherein
   the obtaining the print data and the making the predetermined notification are executed by a predetermined program, and
   the predetermined program is a printer driver.

2. The control method according to claim 1, further comprising:
   generating a first image representing the special color printing region set to be printed in a first special color in the region to be printed based on the print data, the special color printing region being set to be printed in the first special color in a state where a setting for performing printing in the first special color is enabled and a setting for performing printing in a second special color different from the first special color is not enabled;
   generating a second image representing regions in the text region in the region to be printed based on the print data, the regions being a region set at a color value corresponding to the first special color and a region set at a color value corresponding to the second special color; and
   comparing the first image and the second image, wherein the predetermined notification is made based on a result of the comparing.

3. The control method according to claim 1, further comprising:
   generating a first image representing the special color printing region set to be printed in a predetermined special color in the region to be printed based on the print data, the special color printing region being set to be printed in the predetermined special color in a state where a setting for performing printing in the predetermined special color is enabled;
   generating a second image representing the special color printing region set to be printed in the predetermined special color in the text region in the region to be printed based on the print data; and
   comparing the first image and the second image, wherein the predetermined notification is made based on a result of the comparing.

4. The control method according to claim 2, wherein the predetermined notification is made based on a fact that the first image and the second image do not match each other, and
   the predetermined notification is not made based on a fact that the first image and the second image match each other.

5. The control method according to claim 1, wherein the predetermined notification is at least one of:
   a notification indicating that a setting of the print data has a possibility of not being correct;
   a notification indicating that the special color printing region is included in the predetermined region; or
   a notification recommending checking a preview of the region to be printed based on the print data.

6. The control method according to claim 1, wherein the predetermined notification is made based on a fact that a printing region set at a color value for performing printing in a predetermined special color is included in the text region in the region to be printed based on the print data even though a setting for performing printing in the predetermined special color is not enabled.

7. The control method according to claim 6, wherein a content of the predetermined notification made based on a fact that the special color printing region is included in the predetermined region is different from a content of the predetermined notification made based on a fact that the printing region set at the color value for performing printing in the predetermined special color is included in the text region even though the setting for performing printing in the predetermined special color is not enabled.

8. The control method according to claim 1, wherein the special color includes at least one of fluorescent pink, fluorescent orange, violet, green, orange, gold, or silver.

9. The control method according to claim 1, wherein the special color includes at least one of fluorescent pink, fluorescent orange, violet, green, orange, gold, or silver.

10. The control method according to claim 1, further comprising displaying a preview image of the region to be printed based on the print data.

11. The control method according to claim 1, wherein
the obtaining the print data and the making the predetermined notification are executed by a predetermined program, and
the print data is obtained from another application different from the predetermined program.

12. The control method according to claim 1, wherein
the obtaining the print data and the making the predetermined notification are executed by a predetermined program, and
the predetermined program is a printer driver.

13. The control method according to claim 1, further comprising enabling a setting for performing printing in any of a plurality of special colors and disabling the setting for performing printing in the any of the special colors based on user operations.

14. A non-transitory storage medium storing a predetermined program, wherein the predetermined program causes a computer of an information processing apparatus to execute:
obtaining print data; and
making a predetermined notification based on a fact that a special color printing region set to be printed in a special color is included in a predetermined region in a region to be printed based on the print data, the predetermined region being a region other than a text region in the region to be printed based on the print data, wherein
the obtaining the print data and the making the predetermined notification are executed by a predetermined program, and
the predetermined program is a printer driver.

15. A method of controlling an information processing apparatus, the control method comprising:
obtaining print data;
making a predetermined notification based on a fact that a special color printing region, set to be printed in a special color, is included in a predetermined region in a region to be printed based on the print data, the predetermined region being a region other than a text region in the region to be printed based on the print data;
generating a first image representing the special color printing region set to be printed in a first special color in the region to be printed based on the print data, the special color printing region being set to be printed in the first special color in a state where a setting for performing printing in the first special color is enabled and a setting for performing printing in a second special color different from the first special color is not enabled;
generating a second image representing regions in the text region in the region to be printed based on the print data, the regions being a region set at a color value corresponding to the first special color and a region set at a color value corresponding to the second special color; and
comparing the first image and the second image, wherein the predetermined notification is made based on a result of the comparing.

* * * * *